E. KRETCHMER.
Bee Hive.
No. 67,123.
Patented July 23, 1867.
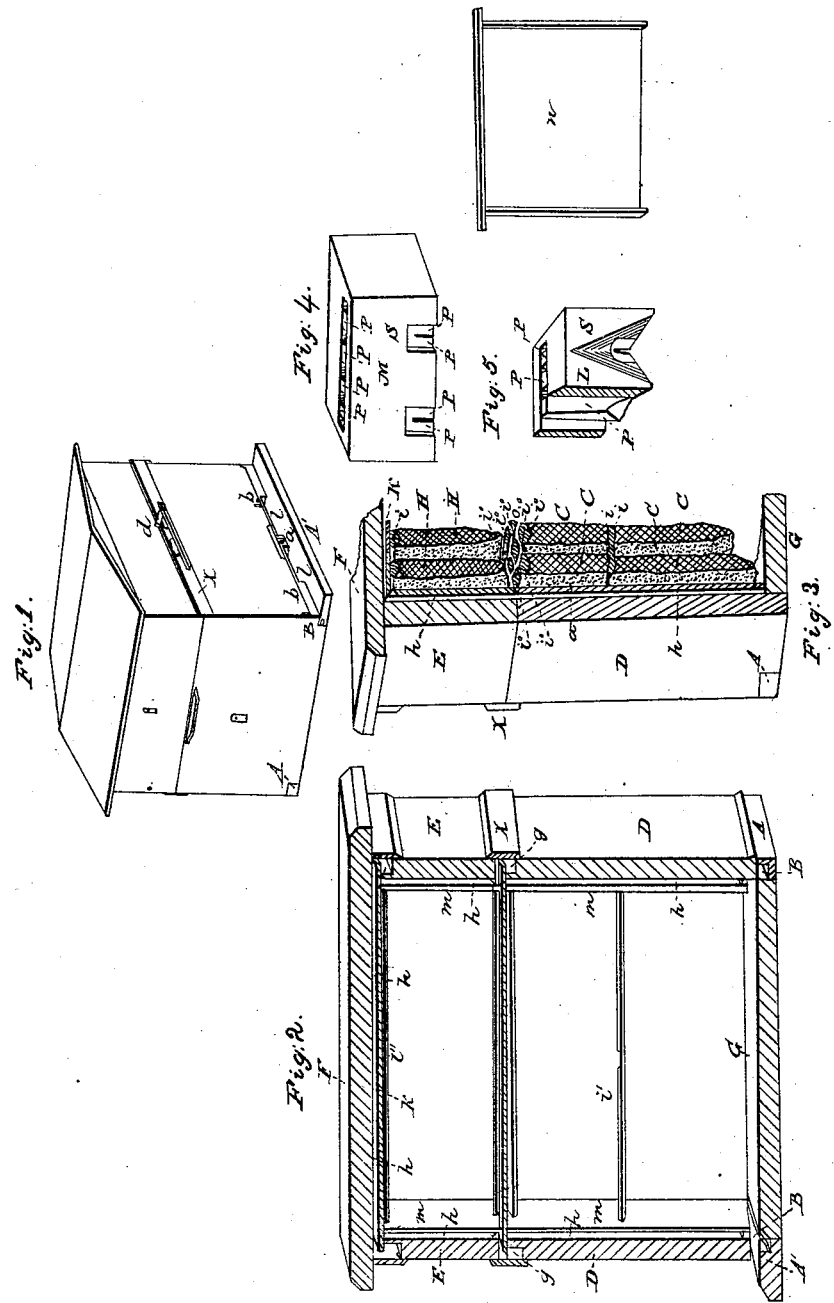

United States Patent Office.

EDWARD KRETCHMER, OF PLEASANT GROVE, IOWA.

Letters Patent No. 67,123, dated July 23, 1867.

IMPROVEMENT IN BEE-HIVES.

The Schedule referred to in these Letters Patent and making part of the same.

TO ALL WHOM IT MAY CONCERN:

Be it known that I, EDWARD KRETCHMER, of Pleasant Grove, in the county of Des Moines, and State of Iowa, have invented a new and improved Mode of Constructing Bee-Hives; and I do hereby declare that the following is a full and exact description thereof, reference being had to the accompanying drawings and the letters marked thereon.

The nature of my invention consists—

First, in providing a crossing or X-shaped bee-passage between the breeding apartment and surplus-honey receptacle for the purpose of preventing the queen from ascending into the surplus-honey receptacle, yet give the heat from the space between every comb of the breeding apartment a large and free passage to the surplus-honey receptacle necessary for early and continual comb building.

Second, in constructing all horizontal bars of the comb-frames with declining sides, to cause all small pieces of wax and other litter from the combs and bees above to roll to the bottom board of the hive, so that the moth miller cannot find any litter up in the hive to deposit her eggs.

Third, in constructing a cross-bar in the movable frame in such a manner as to cause bees to continue the building of worker-comb.

Fourth, in providing a centre bee-passage through all the combs for the purpose of enabling queen and workers to have access to both sides of every comb without passing around the edges of the combs To enable others skilled in the art to use and make my invention, I will proceed to describe its construction and operation. In the accompanying drawings, forming a part of this specification—

Figure 1 represents the hive in perspective view.

Figure 2 is a longitudinal side view, and

Figure 3 a cross view of a rear quarter.

The body of the hive is a square box. In the upper outer corner of the end pieces D D, fig. 2, I cut a rabbet, $g$, with ends closed by the side pieces of the box. Upon this square box I set another shallower box, E E, fig. 2. This shallow box has a cleat, X, fastened to the lower outer corner so as to cover the rabbet $g$ in the box D, and thus an air-chamber is formed, communicating with the interior of the hive through the space of the hereafter-described frames, formed between the bars $o$ $o$, which are near the middle of the hive. Through an opening, $d$, fig. 1, in the cleat X, fresh air is admitted into the chamber $g$, and from there admitted equally into the hive, and foul air conducted from the hive through the opposite chamber. The bottom board G of the box is permanently attached to the sides. The alighting-board, A′, and a narrow strip, A, of the rear of the hive, are attached to the box with a screw, near one corner, and on which each piece swings horizontally. In the edges of the pieces A′ and A, which touch the bottom board, I cut a groove, B, communicating with the interior of the hive, so that all litter of the hive, as pieces of comb or wax and bee-bread, can readily roll into said groove. Now, as the moth miller generally deposits her eggs into the litter of the hive, I leave the ends of the groove open so as to admit the moth miller into them, where she will deposit her eggs, and from where they can easily be excluded by pushing a piece of lath through the groove, or the traps thus formed can easily be opened by swinging them from the bottom board G. The interior of these boxes I provide with movable frames, which I will call R, arranged side by side, consisting of two vertical pieces, $m$ $m$, a top bar, K, comb-bars $i''$ $i°$ $i$ $i'$, and side bars $o$ $o$. The comb-bar $i''$ is a narrow bar; its lower surface is bevelled on each side to an obtuse angle. On this bar bees commence the building of their combs, as represented by H H, fig. 3. This comb contains the surplus honey. For the purpose of removing the surplus honey without removing the brood-comb in the lower part of the frame, I separate the upper one-third of the vertical pieces of the frame so that the honey may easily be taken out without disturbing the brood. The bars $i°$, $i$, and $i'$ are made with an obtuse angle above and below, representing a parallelogram in a cross view. They are made with an obtuse angle above for the purpose of admitting all pieces of wax, bee-bread, or other litter of the hive to slide to the bottom board, and into the grooves B, so that the moth miller will find no litter in the interior of the hive, wherein she could deposit her eggs. The bars $i$ and $i'$ are made with an obtuse angle below to give bees a chance to start their brood-combs. The manner in which these combs are built is represented at C C, fig. 3. In order to prevent the queen from ascending into the part of the frame which contains the surplus honey, I construct a crossing or X-shaped bee-passage by placing two triangular bars, O O, between the bars $i^o$ and $i$. Without this crossing passage the queen will ascend and deposit eggs in empty cells among other cells filled with honey, bees will carry bee-bread to feed the hatching brood, and thus the purity of honey is impaired to such an extent as to make it almost unfit for use. The bar $i'$ is a narrow bar, not more than one-half of an inch wide, fastened about six inches from the lower ends of the vertical pieces $m$. It is a well-known fact among bee-keepers that bees will build the lower part of their comb of drone size, only adapted to raise a large amount of idle consumers. In order to avoid this I place in the bar $i'$, and by constructing it narrower than worker-comb, with an obtuse angle below, they will always build worker-comb, the bar being too narrow to start drone-comb, which is nearly three-eighths of an inch thicker, and the obtuse angle makes the bar too blunt to start the larger-sized drone-cells. In the middle of the bar $i'$ I cut a curved notch so as to leave a small hole through the comb through which the bees can pass to reach every side of the comb, without compelling them to pass around the edge, which in cold weather would result in freezing the bees before they could regain the cluster. The top bars K and the vertical pieces $m\ m$ are made wide enough to have the edges of the several frames to touch each other, forming a second wall, or a close side independent of the case. These frames are constructed a little shorter than the interior space, of length and height of the case or body of the hive, so as to leave a dead-air space between the case and the frames R. The triangular bars O O are fastened flush with the outer edge of the vertical pieces $m\ m$, so that the bars $o\ o$ will touch the same bars of the next adjoining frame, forming an intermediate between surplus honey and brood-comb with no other passage as the X-shaped bee-passage above described. Between the side of the case and the frames in the interior I have a movable board, $n$, provided with narrow cleats near each end, and a cleat on top. These cleats join and correspond with the top K and vertical pieces $m\ m$ of the comb-frames R, having a space between the several cleats by which the comb of the adjoining frame is kept from being attached to the movable board, and which enables bees to pass freely, thus avoiding all hiding places for moth. These movable side boards, when inserted in the place described, are to serve, first, to make the hive double sided; second, to make space on the sides of the frames R when the movable sides are removed, so that the frames can be moved from each other for the purpose of making room between the frames R, necessary for easy removal, without crushing of bees or injuring of combs, and without having a door in the side of the hive, which will swell in wet weather and shrink if exposed to the sun, leaving cracks for rain and vermin to pass in the hive. Between the sides of the case and the movable sides $n$, I insert a wedge-shaped piece of lath for the purpose of closing the crevices between the frames so as to prevent the bees from depositing their "bee-glue" between the frames, and to leave no crevice for heat to escape, or where moth might obtain a lodging place. Thus the construction of the frames R, when used in combination with the movable sides $n$, is such as to entirely exclude the bees from the interior sides and top of the case so as to prevent the bees from gluing the frames to the case at any place, permitting the easy and speedy removing of combs without jar. The bee-entrance $e\ e$, fig. 1, is regulated with four or any number of square sections, arranged side by side, and held in place by a wire, $b\ b$, fig. 1, in such a manner that the sections may be slid over the entrance $e\ e$ so as to diminish or entirely close the bee-entrance. In connection with these sections I use a "bee-trap," S, represented by Figures 4 and 5. This bee-trap is a square block of wood, with a mortise from top to bottom. On the bottom side, across the mortise, I cut one or more tapering notches for bee-passages. In the mortise I suspend a number of pendulum-like wooden blocks, P, two for every bee-passage made in the main block. One corner of the blocks P P is bevelled from the front side L, and arranged to swing freely on a piece of wire passed through a hole in the upper end of the blocks P P. By removing the blocks $a$, fig. 1, and inserting in its place the bee-trap S, the side M towards the interior, and closing the entrance $e\ e$ with the sections, the bees have no other entrance than to pass through the bee-trap. In the act of passing in they will easily press the blocks P P from each other, owing to their being bevelled from the outside. As soon as the bees have passed through, the blocks P P will of course swing together again and the bees prevented from returning by leaving the blocks P P square from the opposite side, so that they cannot be pressed apart. Thus the hive is entirely shut for return passage. When the trap S is adjusted as described, wild bees can be caught by first baiting them into the hive with honey, allowing them to pass in at the entrance $e\ e$. After they are accustomed to enter the hive I adjust the sections, and the bees will enter through the bee-trap. Robber bees can be entraped likewise, and the bees belonging to a certain hive collected in their hive in a short time in case they are to be sold in the middle of the day, when most of the bees are abroad. Drones can be excluded by reversing the bee-trap, the side L towards the interior allowing the drones to pass out through the bee-trap and prevent them from returning, allowing the worker bees to return to their hive under the sections, made small enough to exclude the larger-sized drones.

I do not claim the moth-traps A' A, with the chamber B, nor the sections for entrance-regulator, for such are not new, being patented to me November 13, 1866; but I claim as new and my invention, and desire to secure by Letters Patent—

The comb-frames R, provided with the bar $i'$ and bars $o\ o\ i$, constructed and arranged substantially as and for the purpose described.

EDWARD KRETCHMER.

Witnesses:
  B. B. CLARK,
  ISAAC LINDER.